(12) United States Patent
Caprioli et al.

(10) Patent No.: US 9,588,766 B2
(45) Date of Patent: Mar. 7, 2017

(54) ACCELERATED INTERLANE VECTOR REDUCTION INSTRUCTIONS

(71) Applicant: Intel Corporation, Santa Clara, CA (US)

(72) Inventors: Paul Caprioli, Hillsboro, OR (US); Abhay S. Kanhere, Fremont, CA (US); Jeffrey J. Cook, Hillboro, OR (US); Muawya M. Al-Otoom, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 624 days.

(21) Appl. No.: 13/630,154

(22) Filed: Sep. 28, 2012

(65) Prior Publication Data

US 2014/0095842 A1 Apr. 3, 2014

(51) Int. Cl.
| | | |
|---|---|---|
| *G06F 12/00* | (2006.01) | |
| *G06F 7/38* | (2006.01) | |
| *G06F 9/00* | (2006.01) | |
| *G06F 9/44* | (2006.01) | |
| *G06F 9/30* | (2006.01) | |

(52) U.S. Cl.
CPC ...... *G06F 9/30036* (2013.01); *G06F 9/30014* (2013.01); *G06F 9/30032* (2013.01)

(58) Field of Classification Search
CPC ............. G06F 9/30036; G06F 9/30032; G06F 9/30014
USPC ........................................................ 712/222
See application file for complete search history.

(56) References Cited

U.S. PATENT DOCUMENTS

| | | |
|---|---|---|
| 7,765,384 B2 | 7/2010 | Le et al. |
| 7,873,812 B1 | 1/2011 | Mimar |
| 8,190,854 B2 | 5/2012 | Codrescu et al. |
| 8,346,833 B2 | 1/2013 | Lin et al. |
| 2004/0193838 A1 | 9/2004 | Devaney et al. |
| 2008/0244220 A1 | 10/2008 | Lin et al. |
| 2008/0263321 A1 | 10/2008 | Le et al. |
| 2010/0118852 A1 | 5/2010 | Codrescu et al. |

(Continued)

OTHER PUBLICATIONS

Korean Intellectual Property Office, PCT Int'l Search Report from foreign counterpart PCT Patent Application No. PCT/US2013/045014 mailed Nov. 19, 2013.

(Continued)

*Primary Examiner* — Chun-Kuan Lee
(74) *Attorney, Agent, or Firm* — Nicholson De Vos Webster & Elliott LLP

(57) ABSTRACT

A vector reduction instruction is executed by a processor to provide efficient reduction operations on an array of data elements. The processor includes vector registers. Each vector register is divided into a plurality of lanes, and each lane stores the same number of data elements. The processor also includes execution circuitry that receives the vector reduction instruction to reduce the array of data elements stored in a source operand into a result in a destination operand using a reduction operator. Each of the source operand and the destination operand is one of the vector registers. Responsive to the vector reduction instruction, the execution circuitry applies the reduction operator to two of the data elements in each lane, and shifts one or more remaining data elements when there is at least one of the data elements remaining in each lane.

17 Claims, 15 Drawing Sheets

(56) References Cited

U.S. PATENT DOCUMENTS

2012/0011348 A1* 1/2012 Eichenberger et al. ...... 712/222
2012/0060020 A1* 3/2012 Gonion et al. ................ 712/222

OTHER PUBLICATIONS

International Preliminary Report on Patentability for Application No. PCT/US2013/045014, mailed Mar. 31, 2015, 5 pages.

\* cited by examiner

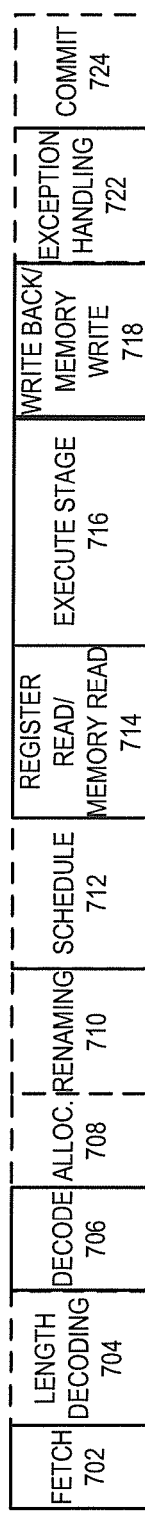
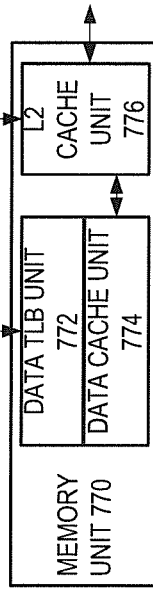
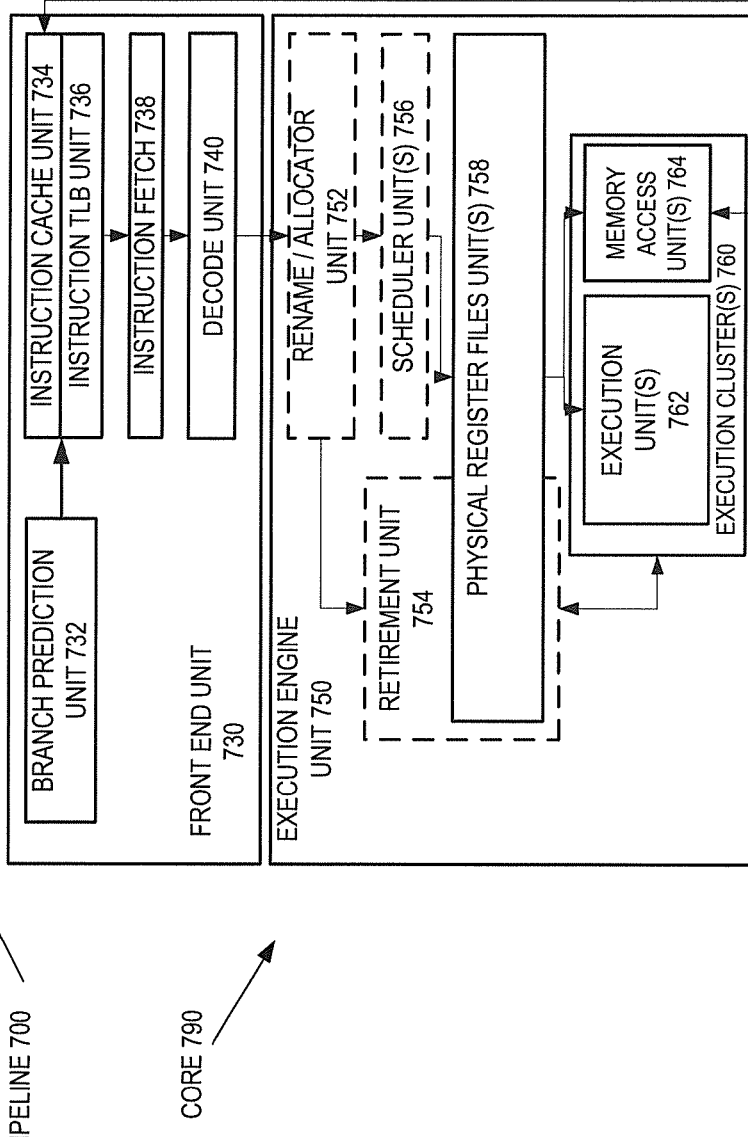
FIG. 7A
FIG. 7B

ACCELERATED INTERLANE VECTOR REDUCTION INSTRUCTIONS

TECHNICAL FIELD

The present disclosure pertains to the field of processing logic, microprocessors, and associated instruction set architecture that, when executed by the processor or other processing logic, perform logical, mathematical, or other functional operations.

BACKGROUND ART

An instruction set, or instruction set architecture (ISA), is the part of the computer architecture related to programming, and may include the native data types, instructions, register architecture, addressing modes, memory architecture, interrupt and exception handling, and external input and output (I/O). The term instruction generally refers herein to macro-instructions—that is instructions that are provided to the processor (or instruction converter that translates (e.g., using static binary translation, dynamic binary translation including dynamic compilation), morphs, emulates, or otherwise converts an instruction to one or more other instructions to be processed by the processor) for execution—as opposed to micro-instructions or micro-operations (micro-ops)—that is the result of a processor's decoder decoding macro-instructions.

The ISA is distinguished from the micro-architecture, which is the internal design of the processor implementing the instruction set. Processors with different micro-architectures can share a common instruction set. For example, Intel® Core™ processors and processors from Advanced Micro Devices, Inc. of Sunnyvale Calif. implement nearly identical versions of the x86 instruction set (with some extensions that have been added with newer versions), but have different internal designs. For example, the same register architecture of the ISA may be implemented in different ways in different micro-architectures using well-known techniques, including dedicated physical registers, one or more dynamically allocated physical registers using a register renaming mechanism, etc.

Many modern ISAs support Single Instruction, Multiple Data (SIMD) operations. Instead of a scalar instruction operating on only one data element or pair of data elements, a vector instruction (also referred to as packed data instruction or SIMD instruction) may operate on multiple data elements or multiple pairs of data elements simultaneously or in parallel. The processor may have parallel execution hardware responsive to the vector instruction to perform the multiple operations simultaneously or in parallel.

A SIMD operation operates on multiple data elements packed within one register or memory location in one operation. These data elements are referred to as packed data or vector data. Each of the vector elements may represent a separate individual piece of data (e.g., a color of a pixel, etc.) that may be operated upon separately or independently of the others.

In some scenarios, a piece of source code may specify a particular order for carrying out a reduction operation on an array of data elements. An example of a reduction operation is addition, which adds all of the data elements in the array to produce a single sum, such as the operation specified in the following serial source code:

```
float *a;
float sum = 0.0;
for (int i = 0; i < 100x1024; ++i){
    sum += a[i];
}
```

The above source code performs a reduction operation on an array by summing array elements in an increasing order. For floating-point data elements, a change to the order in which the data elements are added can change the final sum—although the change can be slight. In scientific computation that requires high-precision arithmetic, even a slight change may be unacceptable. Therefore, there is a need to maintain the order in which the data elements are operated to preserve the precise rounding behavior specified by the source code. However, serial computation such as the above is time consuming. If the floating point computations could be reordered, the summation could be accomplished by accumulating four partial sums, which would then be added together outside of the loop. In this case, the loop body loads four single-precision values at a time and would contain:

```
movups (%[a], %[i], 4), %xmm0 // load 16B
addps %xmm0, %[sum]
```

The above assembly code uses packed data addition (also referred to as vector addition) 'addps' which accumulates the content of a vector register (xmm0) into a sum. The assembly code is more efficient than the serial source code for its use of vector operation; however, the assembly code does not preserve the order of the reduction operation as in the serial source code and may generate a different result from that of the serial source code.

BRIEF DESCRIPTION OF THE DRAWINGS

Embodiments are illustrated by way of example and not limitation in the Figures of the accompanying drawings:

FIG. 7A is a block diagram of an in-order and out-of-order pipeline according to one embodiment.

FIG. 7B is a block diagram of an in-order and out-of-order core according to one embodiment.

DESCRIPTION OF THE EMBODIMENTS

Figure 1:
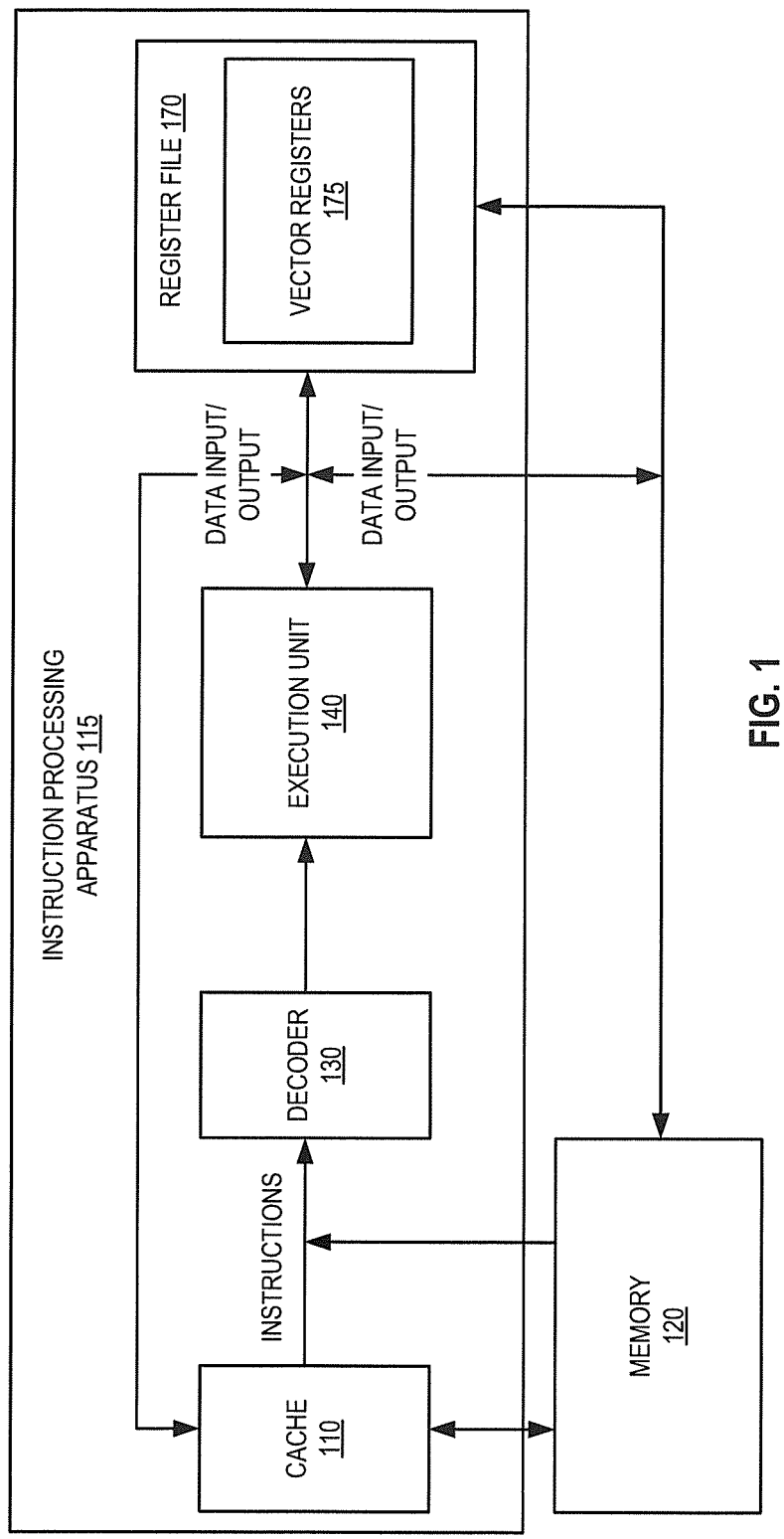
FIG. 1 is a block diagram of an instruction processing apparatus including vector registers according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description.

Embodiments described herein provide vector reduction instructions to accelerate reduction operations. The reduction operations can be additive reductions, multiplicative reductions or subtractive reductions. The vector reduction instructions can be applied to an array of data elements of any sizes in any numerical data formats that can be processed by a processor, such as 64-bit double precision floating point numbers, 32-bit single precision floating point numbers, 16-bit half precision floating point numbers, or other numerical data formats. Given a pre-defined order for performing a reduction operation, the vector reduction instructions can be arranged such that the processor performs the reduction operation in the given pre-defined order using vector operations (also referred to as packed data operations) to improve efficiency. In some embodiments, the vector reduction instructions may be generated by a compiler that compiles serialized code in a high-level language into vector code in binary or other intermediate formats. In some embodiments, the vector reduction instructions may be generated by a binary translation/converter system that translates or otherwise converts vector code of a shorter vector width into another vector code of a wider vector width, or from vector code that does not utilize the new reduction instructions into another vector code that utilizes the new reduction instructions. In some other embodiments, the vector reduction instructions may be written into a program by a computer programmer.

In one embodiment, the vector reduction instructions include VADDREDUCEPS, VMULTREDUCEPS, VSUBREDUCEPS, as well as their variants for different arithmetic operations and different numerical data formats (e.g., single-precision, double-precision, half-precision, etc.). The prefix 'V' indicates vector operations; 'ADD', 'MULT' and 'SUB' indicates addition, multiplication and subtraction, respectively; the suffix 'P' indicates packed operations (i.e., vector operations), and the suffix 'S' indicates single precision data elements. In other embodiments, different notations may be used for the same or similar instructions. To simplify the discussion, the following description may use the term 'vector reduction instruction' to represent any or all of these reduction instructions and their variants unless specifically stated otherwise. In one embodiment, these vector reduction instructions cause a processor to perform an arithmetic operation (e.g., add, subtract, multiply, etc.) on an array of data elements and shuffle the data elements in the array. The vector reduction instructions use one or more vector registers as operands, where the vector register that serves as the source operand is loaded with the array of data elements. Each vector reduction instruction can operate on multiple data elements: some of the data elements are mathematically operated on (e.g., add, subtract, multiply, etc.) and some of the data elements are shuffled (e.g., shifted to a different position in the array). The vector reduction instructions can accelerate the reduction operations while preserving the same order of operations to generate the same result as a serial source code or another source code that specifies any given order of operations.

FIG. 1 is a block diagram of an embodiment of an instruction processing apparatus 115 having an execution unit 140 that includes circuitry operable to execute instructions, including the new reduction instructions. In some embodiments, the instruction processing apparatus 115 may be a processor, a processor core of a multi-core processor, or a processing element in an electronic system.

A decoder 130 receives incoming instructions in the form of higher-level machine instructions or macroinstructions, and decodes them to generate lower-level micro-operations, micro-code entry points, microinstructions, or other lower-level instructions or control signals, which reflect and/or are derived from the original higher-level instruction. The lower-level instructions or control signals may implement the operation of the higher-level instruction through lower-level (e.g., circuit-level or hardware-level) operations. The decoder 130 may be implemented using various different mechanisms. Examples of suitable mechanisms include, but are not limited to, microcode, look-up tables, hardware implementations, programmable logic arrays (PLAs), other mechanisms used to implement decoders known in the art, etc.

The decoder 130 may receive incoming instructions for a cache 110, a memory 120 or other sources. The decoded instructions are sent to the execution unit 140. The execution unit 140 may receive from the decoder 130 one or more micro-operations, micro-code entry points, microinstructions, other instructions, or other control signals, which reflect, or are derived from the received instructions. The execution unit 140 receives data input from and generates data output to a register file 170, the cache 110, and/or the memory 120.

In one embodiment, the register file 170 includes architectural registers, which are also referred to as registers. Unless otherwise specified or clearly apparent, the phrases architectural registers, register file, and registers are used herein to refer to registers that are visible to the software and/or programmer (e.g., software-visible) and/or the registers that are specified by macroinstructions to identify operands. These registers are contrasted to other non-architectural registers in a given microarchitecture (e.g., temporary registers, reorder buffers, retirement registers, etc.).

To avoid obscuring the description, a relatively simple instruction processing apparatus 115 has been shown and described. It is to be appreciated that other embodiments may have more than one execution unit. For example, the apparatus 115 may include multiple different types of execution units, such as, for example, arithmetic units, arithmetic logic units (ALUs), integer units, floating point units, etc.

Still other embodiments of instruction processing apparatus or processors may have multiple cores, logical processors, or execution engines. A number of embodiments of the instruction processing apparatus 115 will be provided later with respect to FIGS. 7-13.

According to one embodiment, the register file 170 includes a set of vector registers 175, which can be used to store the operands of the vector reduction instructions. Each vector register 175 can be 512 bits, 256 bits, or 128 bits wide (i.e., 64 bytes, 32 bytes, or 16 bytes wide), or a different vector width may be used.

Figure 2:
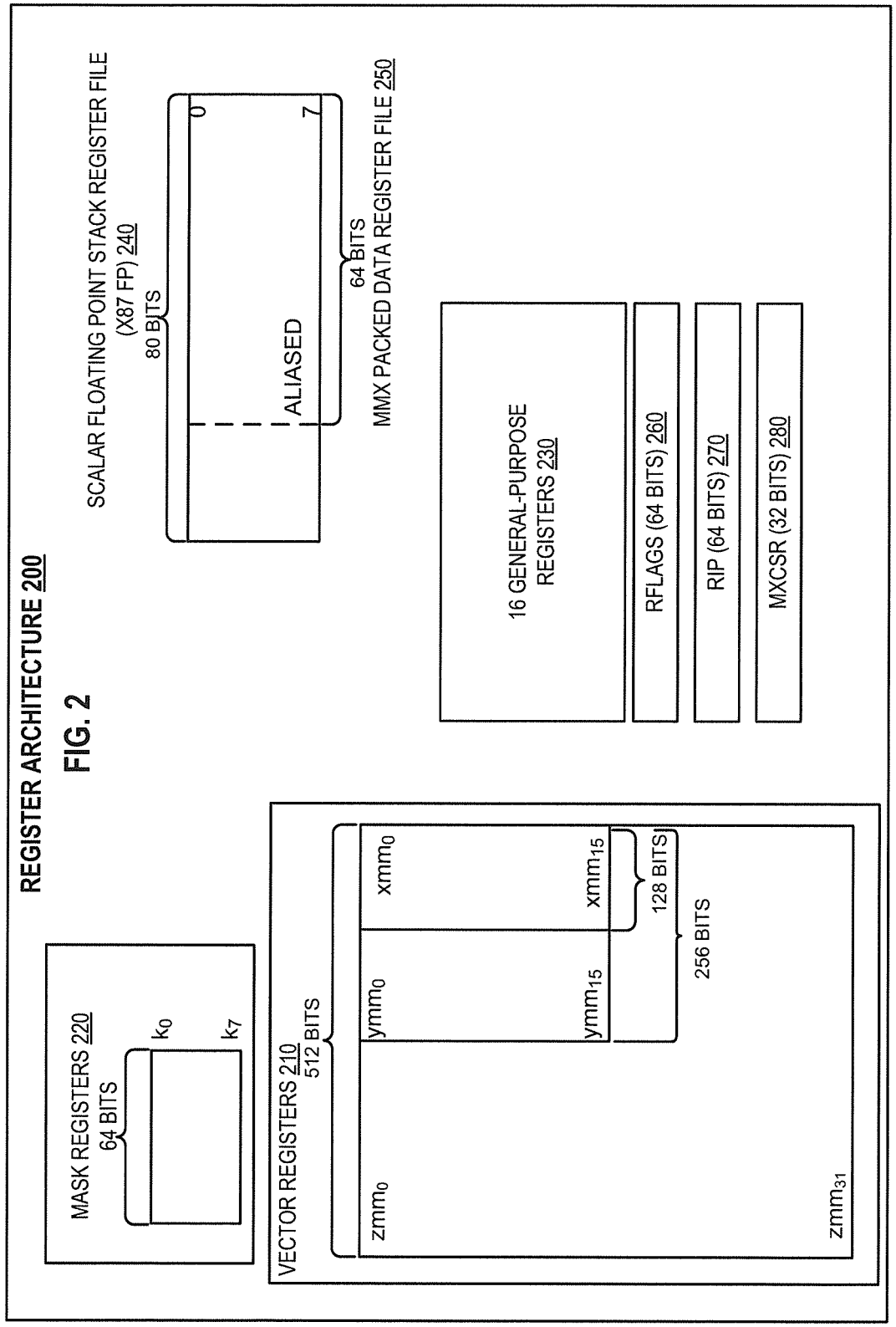
FIG. 2 is a block diagram of register architecture according to one embodiment.

FIG. 2 illustrates an embodiment of underlying register architecture 200 that supports the instructions described herein. The register architecture 200 is based on the Intel® Core™ processors implementing an instruction set including x86, MMX™, Streaming SIMD Extensions (SSE), SSE2, SSE3, SSE4.1, and SSE4.2 instructions, as well as an additional set of SIMD extensions, referred to the Advanced Vector Extensions (AVX) (AVX1, AVX2 and AVX3). However, it is understood different register architecture that supports different register lengths, different register types and/or different numbers of registers can also be used.

In the embodiment illustrated, there are thirty-two vector registers 210 that are 512 bits wide; these registers are referenced as zmm0 through zmm31. The lower order 256 bits of the lower sixteen zmm registers are overlaid on registers ymm0-16. The lower order 128 bits of the lower sixteen zmm registers (the lower order 128 bits of the ymm registers) are overlaid on registers xmm0-15. In the embodiment illustrated, there are eight mask registers 220 (k0 through k7), each 64 bits in length. In an alternate embodiment, the mask registers 220 are 16 bits width.

In the embodiment illustrated, the register architecture 200 further includes sixteen 64-bit general-purpose (GP) registers 230. In an embodiment they are used along with the existing x86 addressing modes to address memory operands. The embodiment also illustrates RFLAGS registers 260, RIP registers 270 and MXCSR registers 280.

The embodiment also illustrates a scalar floating point (FP) stack register file (x87 stack) 240, on which is aliased the MMX packed integer flat register file 250. in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and xmm registers.

Alternative embodiments of the invention may use wider or narrower registers. Additionally, alternative embodiments of the invention may use more, less, or different register files and registers.

Figure 3A:
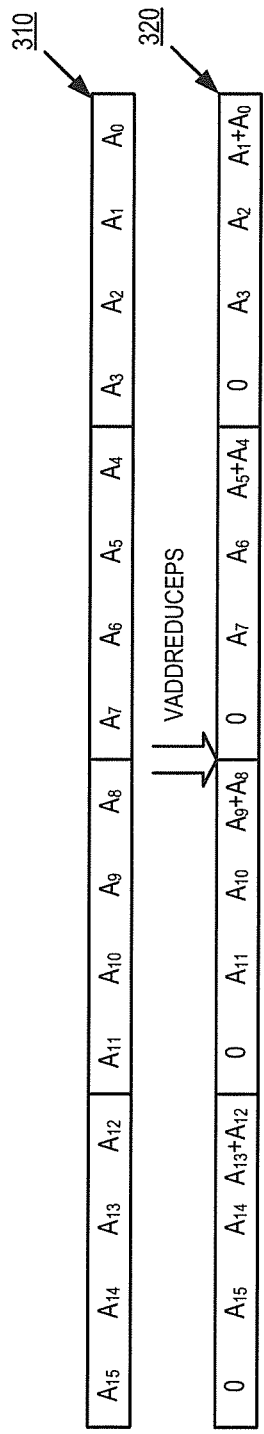
FIG. 3A illustrates an example of a vector reduction operation for single-precision values according to one embodiment.
Figure 3B:
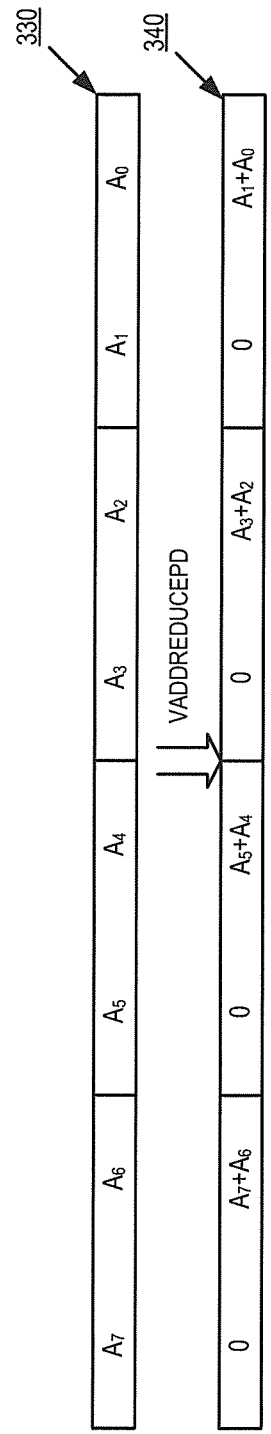
FIG. 3B illustrates an example of a vector reduction operation for double-precision values according to one embodiment.

FIGS. 3A and 3B are diagrams illustrating examples of the reduction operations performed by a processor (e.g., the instruction processing apparatus 115) in response to a VADDREDUCEPS instruction (for single precision) and VADDREDUCEPD instruction (for double precision), respectively. A half-precision version can be similarly defined. Although the examples use additions for the reduction operations, in alternative embodiments the addition operator may be replaced by any arithmetic operator that can reduce a sequence of numbers into a single number, where the order in which the operations are performed may change the value of that single number.

Each vector register 310, 320, 330 and 340 in this example is shown to be 64 bytes in width, such as the zmm register of FIG. 2. Each vector register is divided into four lanes, each lane (16 bytes) stores the same number of data elements, such as four single-precision floating point numbers. In alternative embodiments, the vector registers can be 16 bytes wide (e.g., the xmm registers of FIG. 2), 32 bytes wide (e.g., the ymm registers of FIG. 2), or a different vector width, and may be divided into a different number of lanes.

In the example of FIG. 3A, the source vector register 310 is loaded with sixteen single-precision data elements $A_0$-$A_{15}$ in four lanes. The VADDREDUCEPS instruction causes a processor to operate identically within each lane to perform an additive reduction operation on the single-precision values. The additive reduction operation adds the two right-most values (i.e., the two lowest-ordered values) in each lane, and shifts the other values in the same lane one position to the right, without crossing the lane boundaries. A zero is inserted into the left most (i.e., the highest-ordered) position in each lane. The result of applying this operation once on the values of the source vector register 310 is shown in a destination vector register 320 of FIG. 3A. In one embodiment, the destination vector register 320 may be the same register as the source vector register 310. In alternative embodiments, the registers 310 and 320 may be different registers.

The example of FIG. 3B shows the VADDREDUCEPD instruction performed by a processor on a data element array of double-precision values in the source vector register 330. The source vector register 330 has the same width as the source vector register 310, and therefore can store eight double-precision values (instead of the sixteen single-precision values of FIG. 3A). The result of applying the VADDREDUCEPD instruction once is shown in the destination vector register 340, which can be the same register as the source vector register 330 or a different register.

More formally, the instruction VADDREDUCEPS SRC, DST executes as follows:
 DST[31:0]=SRC[31:0]+SRC[63:32]
 DST[63:32]=SRC[95:64]
 DST[95:64]=SRC[127:96]
 DST[127:96]=0
 DST[159:128]=SRC[159:128]+SRC[191:160]
 DST[191:160]=SRC[223:192]
 DST[223:192]=SRC[255:224]
 DST[255:224]=0
 DST[287:256]=SRC[287:256]+SRC[319:288]
 DST[319:288]=SRC[351:320]
 DST[351:320]=SRC[383:352]
 DST[383:352]=0
 DST[415:384]=SRC[415:384]+SRC[447:416]
 DST[447:416]=SRC[479:448]
 DST[479:448]=SRC[511:480]
 DST[511:480]=0

The double-precision version, VADDREDUCEPD SRC, DST executes as follows:
 DST[63:0]=SRC[63:0]+SRC[127:64]
 DST[127:64]=
 DST[191:128]=SRC[191:128]+SRC[255:192]
 DST[255:192]=0
 DST[319:256]=SRC[319:256]+SRC[383:320]
 DST[383:320]=0
 DST[447:384]=SRC[447:384]+SRC[511:448]
 DST[511:448]=0

Analogous reduction operations for subtraction, multiplication, or other arithmetic operations can also be defined. Further, the AVX3 merging-masking or zeroing-masking can be applied when writing the final destination register. In one embodiment, the K mask registers 220 (of FIG. 2) can be used to modify the result written into the final destination register. If no mask register is specified, the entire destination register is written (as described in the previous paragraph). In an alternative embodiment where merge-masking is applied, a mask register can be specified which preserves the original contents of specified positions in the destination register. With merge-masking, the results calculated in the previous paragraph are merged with the existing contents of the destination register before the final value is written to the destination register. In an alternative embodiment where zero-masking is applied, a mask is supplied in a mask register which specifies positions in the destination register which should be zeroed.

Figure 4A:
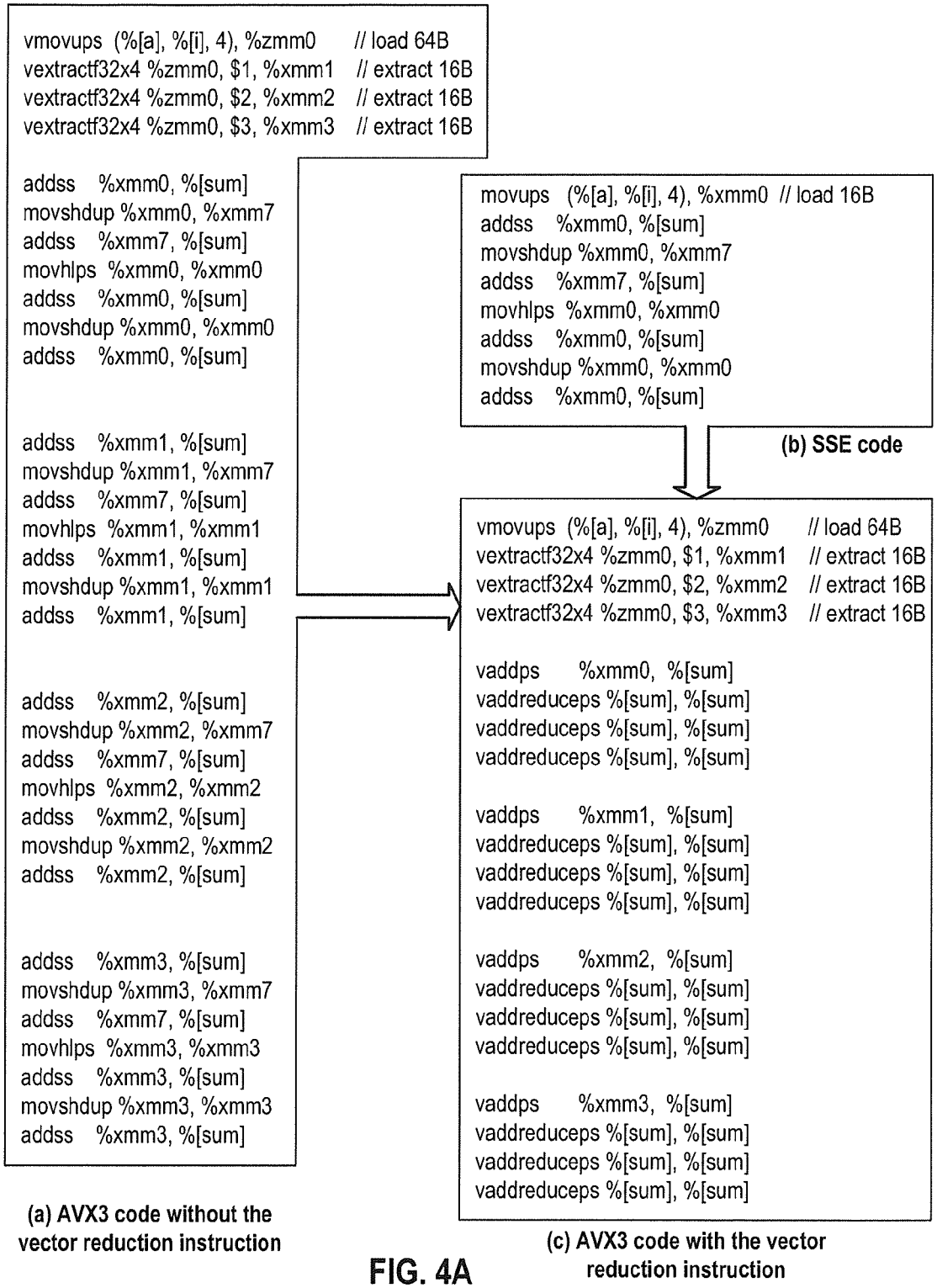
FIG. 4A illustrates an example of converting code without a vector reduction instruction to translated code with vector reduction instructions according to one embodiment.

FIG. 4A shows an example of assembly code for performing an additive reduction operation on an array of single-precision data elements in an increasing order of the array positions. The assembly code shows the scenarios (a) AVX3 code without the VADDREDUCEPS instruction, (b) SSE code, and (c) AVX3 code with the VADDREDUCEPS instruction. The arrows between (a) and (c) and between (b) and (c) indicate that the assembly codes in (a) and (b) can be translated or otherwise converted into the code in (c); e.g., by a computer system running a compiler or a code translator/converter, or by a programmer. It is noted that the AVX3 code in (a) and (c) can load sixteen single-precision data elements at a time, while the SSE code in (b) can only load 4 elements at a time. Therefore, the SSE code needs to loop four times to process the same number of elements as in one loop of the AVX3 code. Due to the serialized nature of the reduction operation, the AVX3 code in (a) and (c) needs to first extract four elements from the 64-byte zmm register into each of the 16-byte xmm0-xmm3 registers. In the code, 'ADDSS' is a scalar addition instruction that is used to add the lowest-ordered elements in the vector register xmm to the sum, and 'ADDPS' is a packed data addition instruction that is used to perform parallel addition. Instructions such as 'MOVSHDUP' and 'MOVHLPS' are various shuffle instructions that are used to shuffle an element to the lowest-ordered position in xmm for a subsequent scalar addition. The total number of additions is the same for each of the code in (a), (b) and (c), as one cannot avoid the need to perform sixteen serial additions given the desire to preserve the original code's floating point round-off behavior. Nevertheless, the AVX3 code in (c) is more efficient than the other two versions—as the VADDREDUCEPS instruction in (c) includes both addition and shuffle operations and eliminates the need for the intra-lane extractions in the sixteen element reduction loop, such as the MOVSHDUP instruction and the MOVHLPS instructions that are present in both (a) and (b).

Figure 4B:
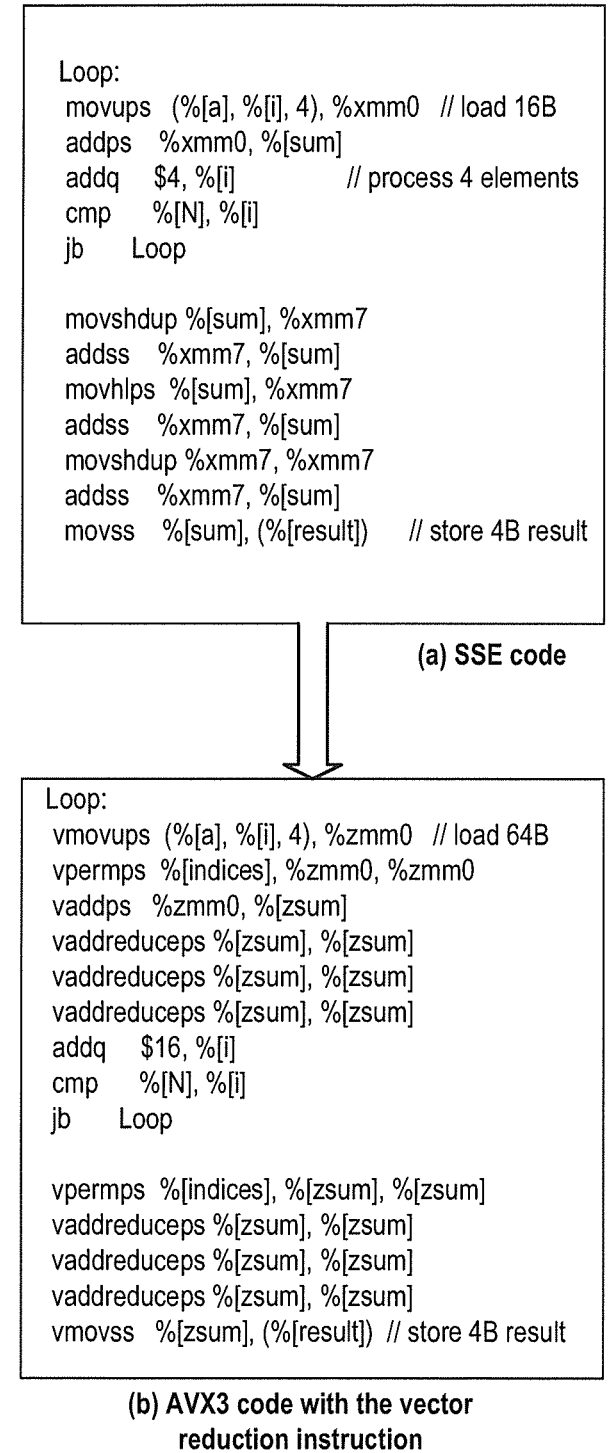
FIG. 4B illustrates another example of converting code without a vector reduction instruction to translated code with vector reduction instructions according to one embodiment.

FIG. 4B shows an additional example of assembly code for performing an additive reduction operation on an array of single-precision data elements, in which the SSE code in (a) is generated to perform the reduction using four partial sums in each of the four lanes, and the four partial sums are then summed into a single value after the loop body.

The assembly code shows the scenarios (a) SSE code and (b) AVX3 code with the VADDREDUCEPS instruction. A compiler or binary translation/converter system may be used to speed up the computation in (a) by converting it into AVX3 code utilizing wider vector registers (each accommodating sixteen single-precision data elements), while preserving the exact floating point rounding behavior of the original SSE code (which has four single-precision data elements in each vector register). The AVX3 code shown in (b) places the four partial sums that are present in the SSE version (i.e., %[sum] in (a)) into the lowest-ordered element of each lane of the zmm register (i.e., %[zsum]). After the body of the loop, the four partial sum elements are themselves summed into a single value. In the AVX3 code in (b), %[indices] contains the constant which determines a permute pattern for the data elements. This permutation moves the lowest-ordered element of each of the four lanes into the four adjacent elements of lowest-ordered lane, and the highest-ordered element of each lane into the four adjacent elements of the highest-ordered lane. That is, %[indices] contains the following 32-bit integers: F,B,7,3,E,A,6,2,D,9,5,1,C,8,4,0 to allow data elements to be operated in the same order as the code in (a). It is noted that the loop body in (b) contains only one extra instruction (the permute instruction VPERMPS) in addition to the necessary four additions.

Figure 5A:
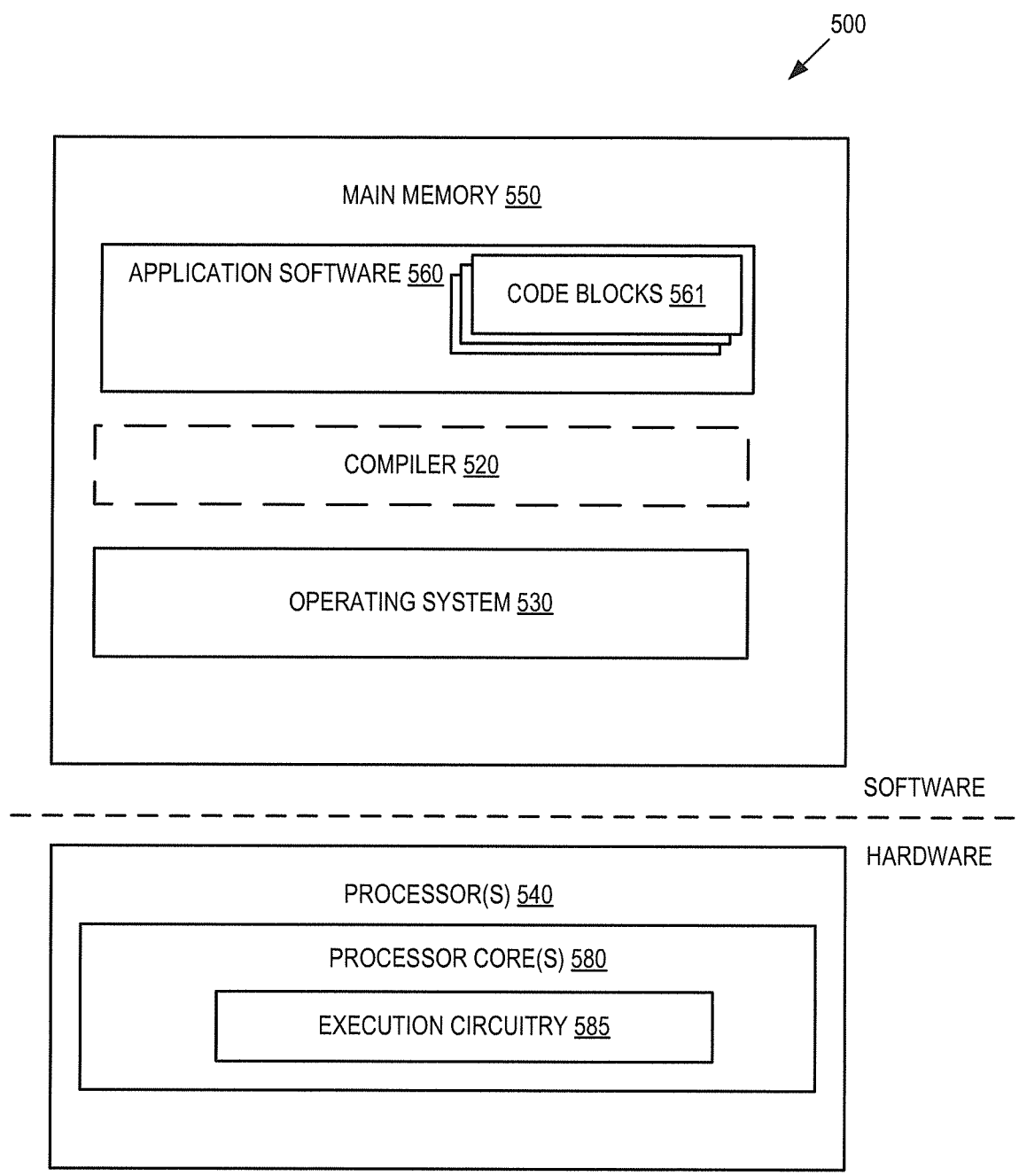
FIG. 5A illustrates elements of a computer system for performing vector reduction instructions according to one embodiment.

FIG. 5A illustrates elements of a computer system 500 according to one embodiment. The computer system 500 includes a main memory 550 to store software, and also includes hardware elements to support the software. The software may include application software 560 (containing code blocks 561) and an OS 530. Other system and user-level software is not shown. In one embodiment, the code blocks 561 are compiled with a compiler 520, which may reside in the main memory 550 or in the memory of a different system. The compiler 520 can be a static compiler or a just-in-time compiler. In some embodiments, the code blocks 561 may reside in any other software running on the OS 530. In one embodiment, the code blocks 561 may be part of the OS 530 or other system software. In one embodiment, the code blocks 561 contain the vector reduction instructions described above.

The system 500 further includes hardware elements, such as one or more processors 540. One or more of the processors 540 may include multiple processor cores 580. In one embodiment, each processor core 580 supports multi-threading, such as the simultaneous multi-threading (SMT) according to the Hyper-threading technology. Each processor core 580 includes execution circuitry 585 to execute the vector reduction instructions. Each processor core 580 also includes vector registers for use in connection with vector reduction instructions. In one embodiment, the processor 540 is the instruction processing apparatus 115 of FIG. 1, and the execution circuitry 585 is the execution unit 140 of FIG. 1.

Figure 5B:
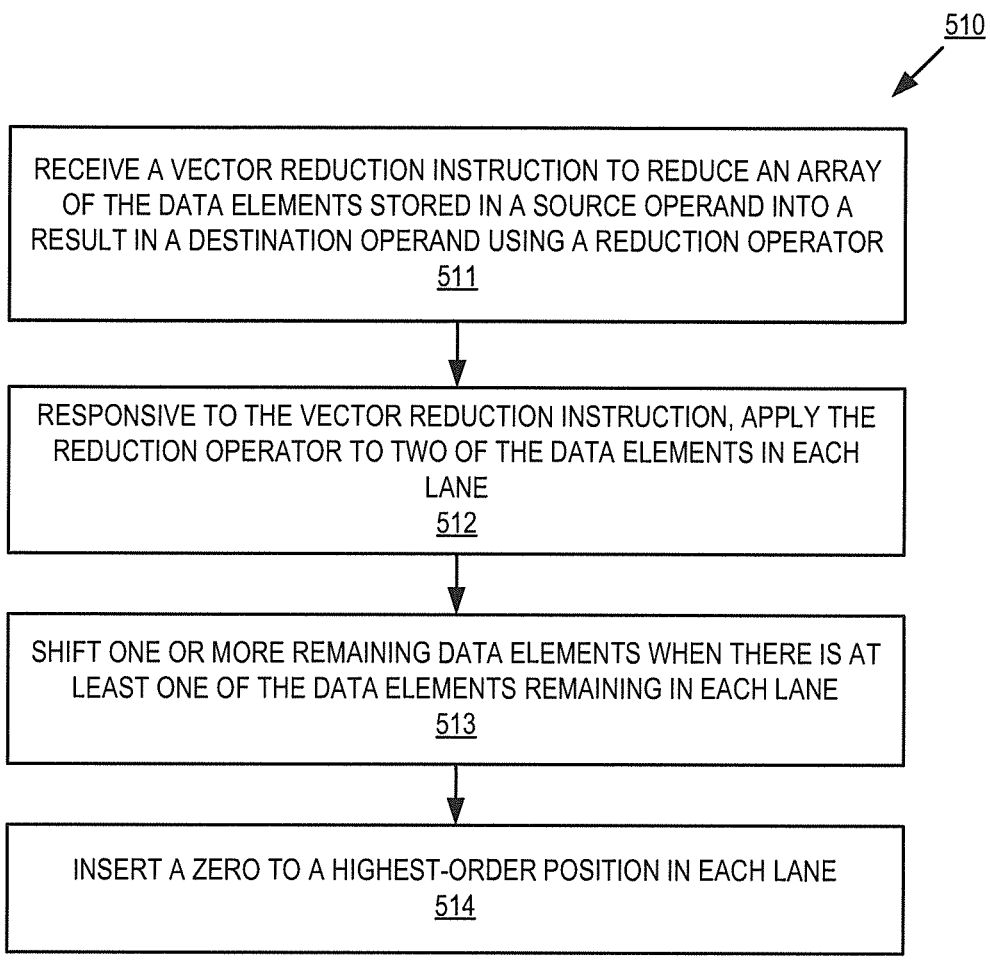
FIG. 5B is a flow diagram illustrating operations to be performed responsive to a vector reduction instruction according to one embodiment.

FIG. 5B is a block flow diagram of a method 510 for executing a vector reduction instruction according to one embodiment. The method 510 begins with a processor (more specifically, e.g., the execution circuitry 585 of FIG. 5A) receiving a vector reduction instruction to reduce an array of the data elements stored in a source operand into a result in a destination operand using a reduction operator (block 511). Each of the source operand and the destination operand is one of a set of vector registers, where each vector register is divided into multiple lanes, and each lane stores the same number of data elements. The reduction operator may be add, subtract, multiply or other arithmetic operators. Each data element may be a double-precision floating point number, a single-precision floating point number, a half-precision floating point number, or other numerical data formats. Responsive to the vector reduction instruction, the processor applies the reduction operator to two of the data elements in each lane (block 512), and shifts one or more remaining data elements when there is at least one of the data elements remaining in each lane (block 513). The processor may also insert a zero into the highest-order position in each lane (block 514). In one embodiment, the processor can convert reduction code that has none of the vector reduction instructions described above into translated reduction code that has one or more of the vector reduction instructions, where the reduction code and the translated reduction code specify the same sequence of reduction operations applied to the array of data elements across the multiple lanes and generate the same result.

In various embodiments, the method of FIG. 5B may be performed by a general-purpose processor, a special-purpose processor (e.g., a graphics processor or a digital signal processor), or another type of digital logic device or instruction processing apparatus. In some embodiments, the method of FIG. 5B may be performed by the execution circuitry 585 of FIG. 5A, the instruction processing apparatus 115 of FIG. 1, or a similar processor, apparatus, or system, such as the embodiments shown in FIGS. 7-13. Moreover, the execution circuitry 585 of FIG. 5A, the instruction processing apparatus 115 of FIG. 1, as well as the processor, apparatus, or system shown in FIGS. 7-13 may perform embodiments of operations and methods either the same as, similar to, or different than those of the methods of FIG. 5B.

In some embodiments, the instruction processing apparatus 115 of FIG. 1 may operate in conjunction with an instruction converter that converts an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof The instruction converter may be on processor, off processor, or part on and part off processor.

Figure 6:
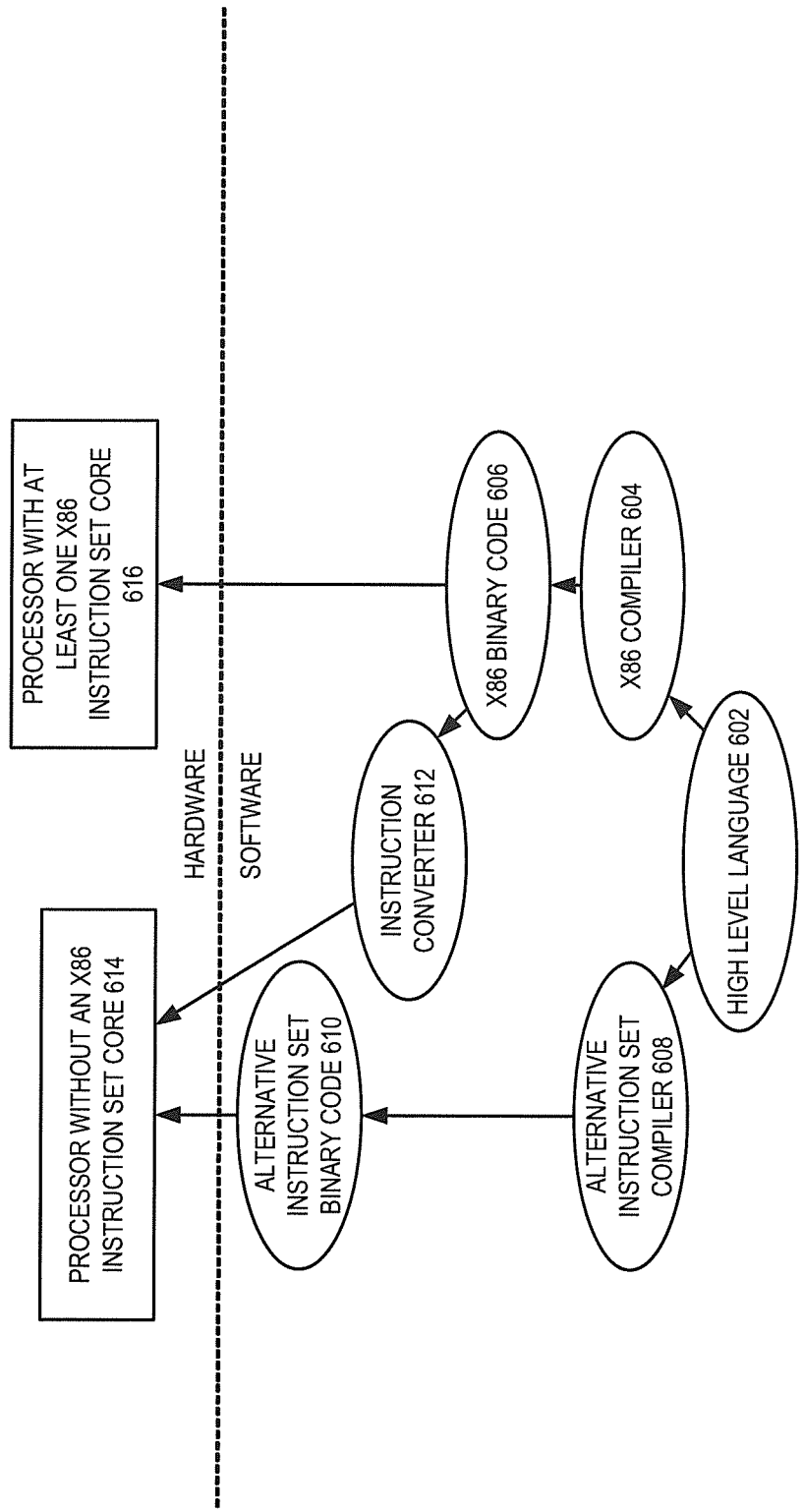
FIG. 6 is a block diagram illustrating the use of a software instruction converter to convert binary instructions in a source instruction set to binary instructions in a target instruction set according to one embodiment.

FIG. 6 is a block diagram contrasting the use of a software instruction converter according to embodiments of the invention. In the illustrated embodiment, the instruction converter is a software instruction converter, although alternatively the instruction converter may be implemented in software, firmware, hardware, or various combinations thereof. FIG. 6 shows a program in a high level language 602 may be compiled using an x86 compiler 604 to generate x86 binary code 606 that may be natively executed by a processor with at least one x86 instruction set core 616. The processor with at least one x86 instruction set core 616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 604 represents a compiler that is operable to generate x86 binary code 606 (e.g., object code) that can, with or without additional linkage processing, be executed on the processor with at least one x86 instruction set core 616. Similarly, FIG. 6 shows the program in the high level language 602 may be compiled using an alternative instruction set compiler 608 to generate alternative instruction set binary code 610 that may be natively executed by a processor without at least one x86 instruction set core 614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 612 is used to convert the x86 binary code 606 into code that may be natively executed by the processor without an x86 instruction set core 614. This converted code is not likely to be the same as the alternative instruction set binary code 610 because an instruction converter capable of this is difficult to make; however, the converted code will accomplish the general operation and be made up of instructions from the alternative instruction set. Thus, the instruction converter 612 represents software, firmware, hardware, or a combination thereof that, through emulation, simulation or any other process, allows a processor or other electronic device that does not have an x86 instruction set processor or core to execute the x86 binary code 606.

Exemplary Core Architectures

In-Order and Out-of-Order Core Block Diagram

FIG. 7A is a block diagram illustrating both an exemplary in-order pipeline and an exemplary register renaming, out-of-order issue/execution pipeline according to embodiments of the invention. FIG. 7B is a block diagram illustrating both an exemplary embodiment of an in-order architecture core and an exemplary register renaming, out-of-order issue/execution architecture core to be included in a processor according to embodiments of the invention. The solid lined boxes in FIGS. 7A and 7B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724.

FIG. 7B shows processor core 790 including a front end unit 730 coupled to an execution engine unit 750, and both are coupled to a memory unit 770. The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit 740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macroinstructions (e.g., in decode unit 740 or otherwise within the front end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 758 comprises a vector registers unit, a write mask registers unit, and a scalar registers unit. These register units may provide architectural vector registers, vector mask registers, and general purpose registers. The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 may include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 is coupled to one or more other levels of cache and eventually to a main memory.

By way of example, the exemplary register renaming, out-of-order issue/execution core architecture may implement the pipeline 700 as follows: 1) the instruction fetch 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722; and 8) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 790 includes logic to support a packed data instruction set extension (e.g., SSE, AVX1, AVX2, etc.), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 734/774 and a shared L2 cache unit 776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 8B:
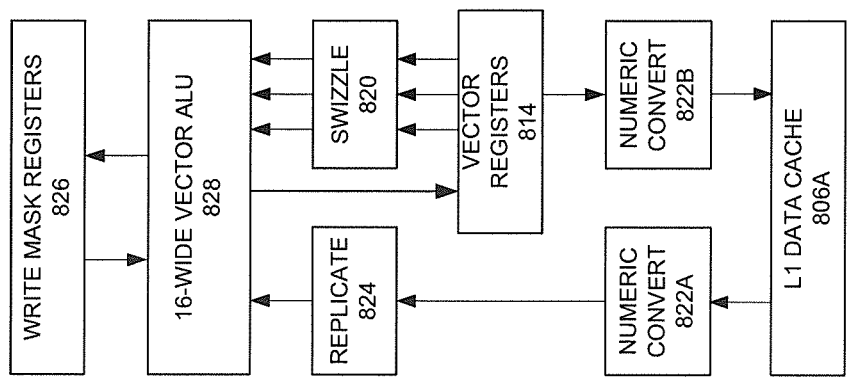
FIGS. 8A-B are block diagrams of a more specific exemplary in-order core architecture according to one embodiment.
Figure 8A:
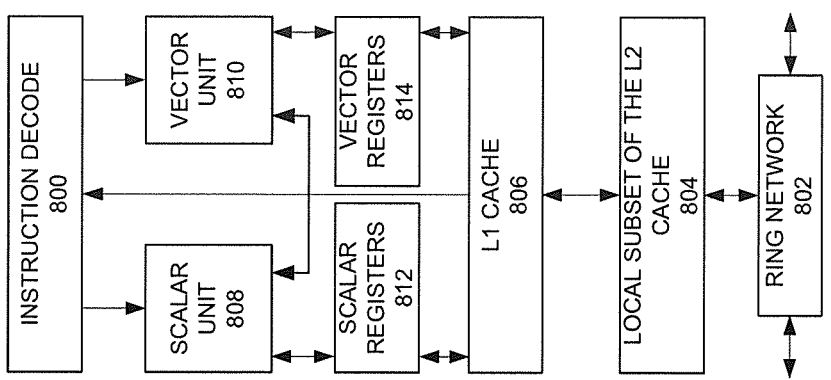

FIGS. 8A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 8A is a block diagram of a single processor core, along with its connection to the on-die interconnect network 802 and with its local subset of the Level 2 (L2) cache 804, according to embodiments of the invention. In one embodiment, an instruction decoder 800 supports the x86 instruction set with a packed data instruction set extension. An L1 cache 806 allows low-latency accesses to cache memory into the scalar and vector units. While in one embodiment (to simplify the design), a scalar unit 808 and a vector unit 810 use separate register sets (respectively, scalar registers 812 and vector registers 814) and data transferred between them is written to memory and then read back in from a level 1 (L1) cache 806, alternative embodiments of the invention may use a different approach (e.g., use a single register set or include a communication path that allow data to be transferred between the two register files without being written and read back).

The local subset of the L2 cache 804 is part of a global L2 cache that is divided into separate local subsets, one per processor core. Each processor core has a direct access path to its own local subset of the L2 cache 804. Data read by a processor core is stored in its L2 cache subset 804 and can be accessed quickly, in parallel with other processor cores accessing their own local L2 cache subsets. Data written by a processor core is stored in its own L2 cache subset 804 and is flushed from other subsets, if necessary. The ring network ensures coherency for shared data. The ring network is bi-directional to allow agents such as processor cores, L2 caches and other logic blocks to communicate with each other within the chip.

FIG. 8B is an expanded view of part of the processor core in FIG. 8A according to embodiments of the invention. FIG. 8B includes an L1 data cache 806A part of the L1 cache 804, as well as more detail regarding the vector unit 810 and the vector registers 814. Specifically, the vector unit 810 is a 16-wide vector processing unit (VPU) (see the 16-wide ALU 828), which executes one or more of integer, single-precision float, and double-precision float instructions. The VPU supports swizzling the register inputs with swizzle unit 820, numeric conversion with numeric convert units 822A-B, and replication with replication unit 824 on the memory input. Write mask registers 826 allow predicating resulting vector writes.

Processor with integrated memory controller and graphics

Figure 9:
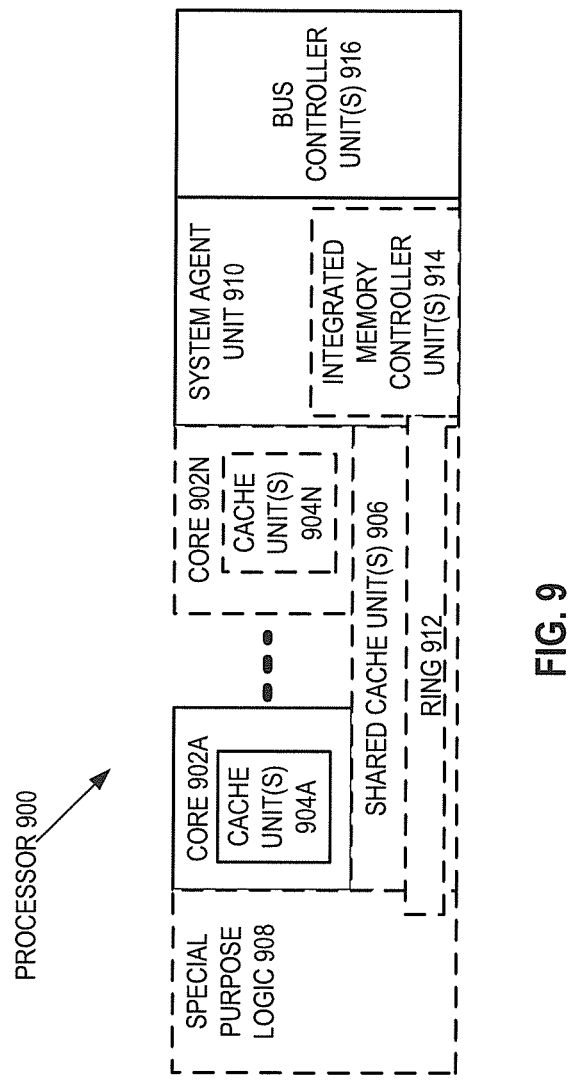
FIG. 9 is a block diagram of a processor according to one embodiment.

FIG. 9 is a block diagram of a processor 900 that may have more than one core, may have an integrated memory controller, and may have integrated graphics according to embodiments of the invention. The solid lined boxes in FIG. 9 illustrate a processor 900 with a single core 902A, a system agent 910, a set of one or more bus controller units 916, while the optional addition of the dashed lined boxes illustrates an alternative processor 900 with multiple cores 902A-N, a set of one or more integrated memory controller unit(s) 914 in the system agent unit 910, and special purpose logic 908.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof. While in one embodiment a ring based interconnect unit 912 interconnects the integrated graphics logic 908, the set of shared cache units 906, and the system agent unit 910/integrated memory controller unit(s) 914, alternative embodiments may use any number of well-known techniques for interconnecting such units. In one embodiment, coherency is maintained between one or more cache units 906 and cores 902A-N.

In some embodiments, one or more of the cores 902A-N are capable of multi-threading. The system agent 910 includes those components coordinating and operating cores 902A-N. The system agent unit 910 may include for example a power control unit (PCU) and a display unit. The PCU may be or include logic and components needed for regulating the power state of the cores 902A-N and the integrated graphics logic 908. The display unit is for driving one or more externally connected displays.

The cores 902A-N may be homogenous or heterogeneous in terms of architecture instruction set; that is, two or more of the cores 902A-N may be capable of execution the same instruction set, while others may be capable of executing only a subset of that instruction set or a different instruction set.

Exemplary Computer Architectures

FIGS. 10-13 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 10:
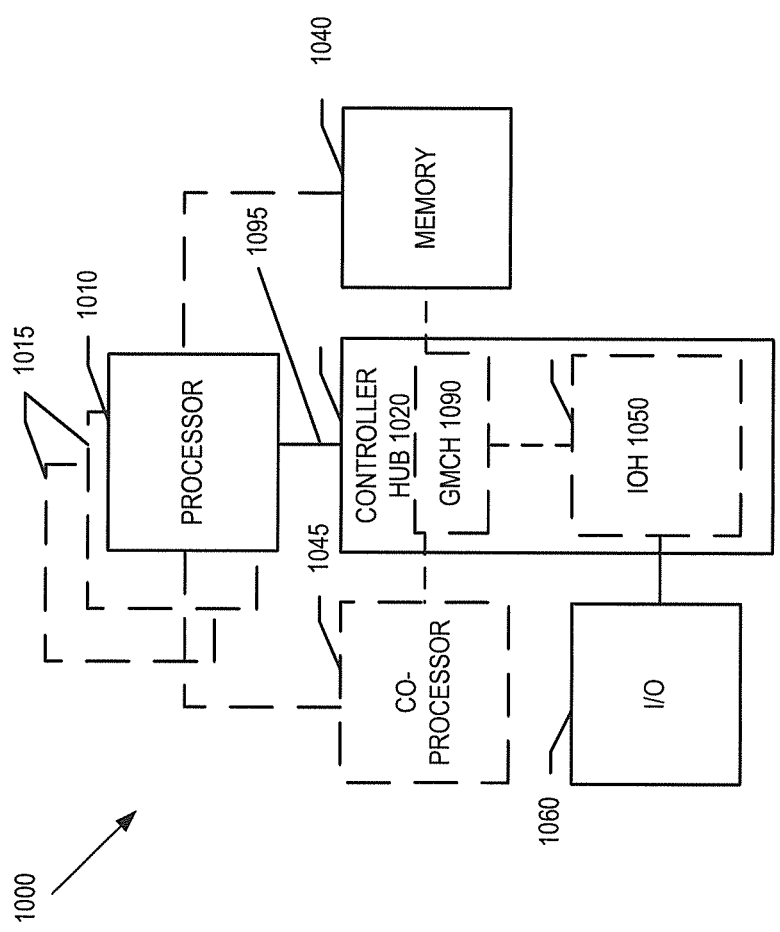
FIG. 10 is a block diagram of a system in accordance with one embodiment.

Referring now to FIG. 10, shown is a block diagram of a system 1000 in accordance with one embodiment of the present invention. The system 1000 may include one or more processors 1010, 1015, which are coupled to a controller hub 1020. In one embodiment the controller hub 1020 includes a graphics memory controller hub (GMCH) 1090 and an Input/Output Hub (IOH) 1050 (which may be on separate chips); the GMCH 1090 includes memory and graphics controllers to which are coupled memory 1040 and a coprocessor 1045; the IOH 1050 is couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 in a single chip with the IOH 1050.

The optional nature of additional processors 1015 is denoted in FIG. 10 with broken lines. Each processor 1010, 1015 may include one or more of the processor cores described herein and may be some version of the processor 900.

The memory 1040 may be, for example, dynamic random access memory (DRAM), phase change memory (PCM), or a combination of the two. For at least one embodiment, the controller hub 1020 communicates with the processor(s) 1010, 1015 via a multi-drop bus, such as a frontside bus (FSB), point-to-point interface such as QuickPath Interconnect (QPI), or similar connection 1095.

In one embodiment, the coprocessor 1045 is a special-purpose processor, such as, for example, a high-throughput MIC processor, a network or communication processor, compression engine, graphics processor, GPGPU, embedded processor, or the like. In one embodiment, controller hub 1020 may include an integrated graphics accelerator.

There can be a variety of differences between the physical resources 1010, 1015 in terms of a spectrum of metrics of merit including architectural, micro-architectural, thermal, power consumption characteristics, and the like.

In one embodiment, the processor 1010 executes instructions that control data processing operations of a general type. Embedded within the instructions may be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor(s) 1045 accept and execute the received coprocessor instructions.

Figure 11:
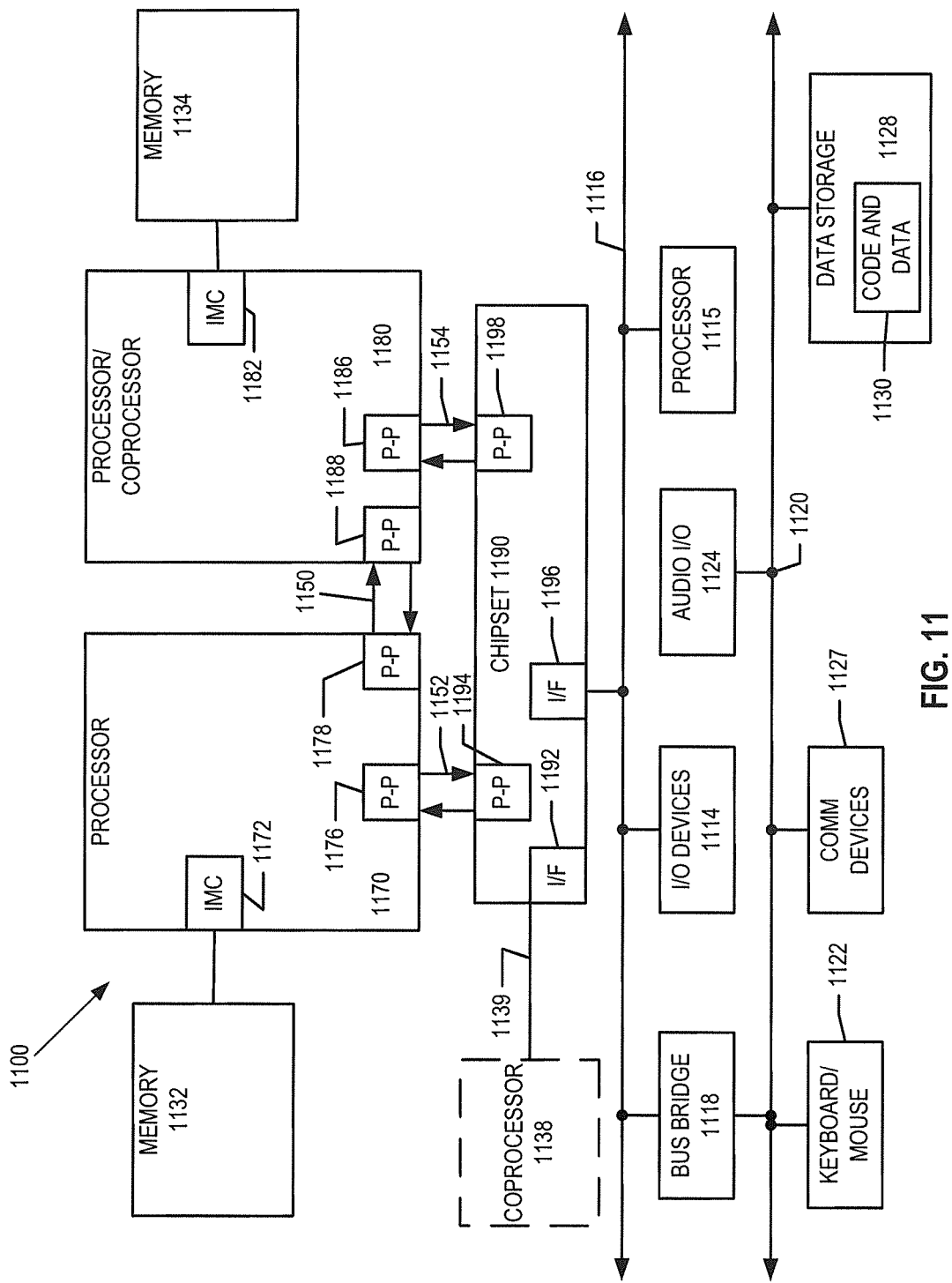
FIG. 11 is a block diagram of a second system in accordance with one embodiment.

Referring now to FIG. 11, shown is a block diagram of a first more specific exemplary system 1100 in accordance with an embodiment of the present invention. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processor 900. In one embodiment of the invention, processors 1170 and 1180 are respectively processors 1010 and 1015, while coprocessor 1138 is coprocessor 1045. In another embodiment, processors 1170 and 1180 are respectively processor 1010 coprocessor 1045.

Processors 1170 and 1180 are shown including integrated memory controller (IMC) units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1139. In one embodiment, the coprocessor 1138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present invention is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) units), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to the second bus 1120. Note that other architectures are possible. For example, instead of the point-to-point architecture of FIG. 11, a system may implement a multi-drop bus or other such architecture.

Figure 12:
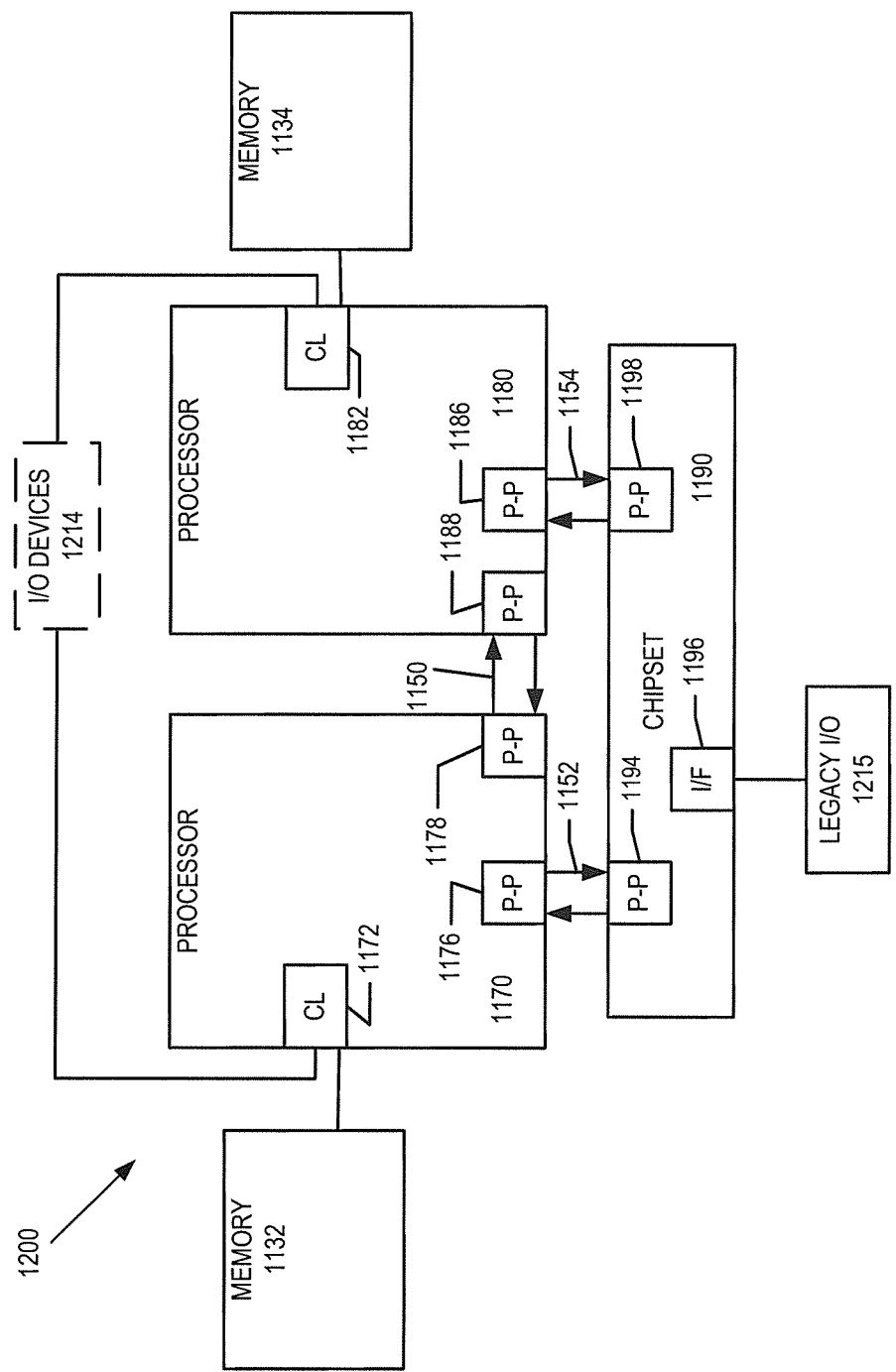
FIG. 12 is a block diagram of a third system in accordance with an embodiment of the invention.

Referring now to FIG. 12, shown is a block diagram of a second more specific exemplary system 1200 in accordance with an embodiment of the present invention. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170, 1180 may include integrated memory and I/O control logic ("CL") 1172 and 1182, respectively. Thus, the CL 1172, 1182 include integrated memory controller units and include I/O control logic. FIG. 12 illustrates that not only are the memories 1132, 1134 coupled to the CL 1172, 1182, but also that I/O devices 1214 are also coupled to the control logic 1172, 1182. Legacy I/O devices 1215 are coupled to the chipset 1190.

Figure 13:
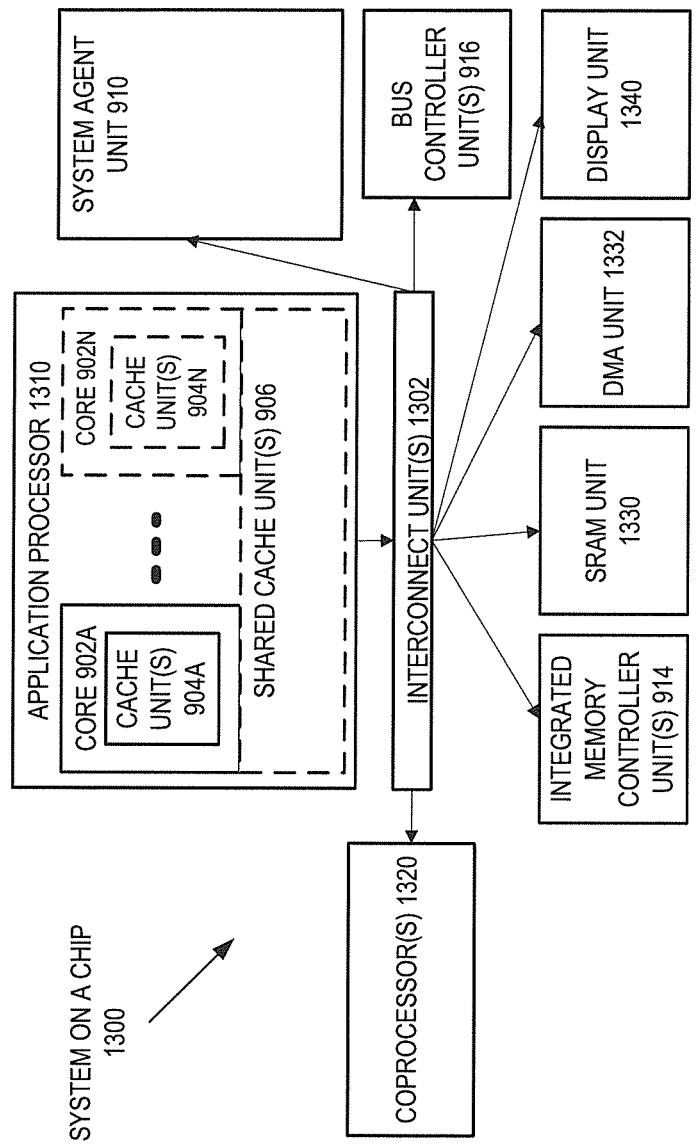
FIG. 13 is a block diagram of a system-on-a-chip (SoC) in accordance with one embodiment.

Referring now to FIG. 13, shown is a block diagram of a SoC 1300 in accordance with an embodiment of the present invention. Similar elements in FIG. 9 bear like reference numerals. Also, dashed lined boxes are optional features on more advanced SoCs. In FIG. 13, an interconnect unit(s) 1302 is coupled to: an application processor 1310 which includes a set of one or more cores 202A-N and shared cache unit(s) 906; a system agent unit 910; a bus controller unit(s) 916; an integrated memory controller unit(s) 914; a set or one or more coprocessors 1320 which may include integrated graphics logic, an image processor, an audio processor, and a video processor; an static random access memory (SRAM) unit 1330; a direct memory access (DMA) unit 1332; and a display unit 1340 for coupling to one or more external displays. In one embodiment, the coprocessor(s) 1320 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
a plurality of vector registers, wherein each vector register is divided into a plurality of lanes, and each lane stores a same number of data elements; and
execution circuitry coupled to the plurality of vector registers, the execution circuitry to:
receive a vector reduction instruction to reduce an array of the data elements stored in a source operand into a result in a destination operand using a reduction operator, wherein each of the source operand and the destination operand is one of the vector registers;
responsive to the vector reduction instruction, apply the reduction operator to two of the data elements in each lane, reduce the two data elements into one data element, and shift one or more remaining data elements when there is at least one of the data elements remaining in each lane;
wherein the execution circuitry is to convert reduction code without the vector reduction instruction into translated reduction code with the vector reduction instruction, wherein the reduction code and the translated reduction code specify a same sequence of reduction operations applied to the array of data elements across the plurality of lanes and generate a same result.

2. The apparatus of claim 1, wherein the execution circuitry responsive to the vector reduction instruction is to insert a zero to a highest-order position in each lane.

3. The apparatus of claim 1, wherein the reduction operator includes add, subtract or multiply.

4. The apparatus of claim 1, wherein the execution circuitry is to apply the reduction operator to two of lowest-ordered data elements in each lane.

5. The apparatus of claim 1, wherein the execution circuitry responsive to the vector reduction instruction is to shift each of the remaining data elements one position to the right within each lane.

6. The apparatus of claim 1, wherein each of the data elements is a double-precision floating point number, a single-precision floating point number, or a half-precision floating point number.

7. A method comprising:
receiving a vector reduction instruction to reduce an array of the data elements stored in a source operand into a result in a destination operand using a reduction operator, wherein each of the source operand and the destination operand is one of a plurality of vector registers, each vector register being divided into a plurality of lanes, and each lane storing a same number of data elements;
responsive to the vector reduction instruction, applying the reduction operator to two of the data elements in each lane, reduce the two data elements into one data element;
shifting one or more remaining data elements when there is at least one of the data elements remaining in each lane; and
converting reduction code without the vector reduction instruction into translated reduction code with the vector reduction instruction, wherein the reduction code and the translated reduction code specify a same sequence of reduction operations applied to the array of data elements across the plurality of lanes and generate a same result.

8. The method of claim 7, further comprising:
responsive to the vector reduction instruction, inserting a zero to a highest-order position in each lane.

9. The method of claim 7, wherein the reduction operator includes add, subtract or multiply.

10. The method of claim 7, wherein applying the reduction operator further comprises applying the reduction operator to two of lowest-ordered data elements in each lane.

11. The method of claim 7, wherein shifting positions further comprises shifting each of the remaining data elements one position to the right within each lane.

12. The method of claim 7, wherein each of the data elements is a double-precision floating point number, a single-precision floating point number, or a half-precision floating point number.

13. A system comprising:
memory; and
a processor coupled to the memory, the processor comprising:
- a plurality of vector registers, wherein each vector register is divided into a plurality of lanes, and each lane stores a same number of data elements; and
- execution circuitry coupled to the plurality of vector registers, the execution circuitry to:
  - receive a vector reduction instruction to reduce an array of the data elements stored in a source operand into a result in a destination operand using a reduction operator, wherein each of the source operand and the destination operand is one of the vector registers,
  - responsive to the vector reduction instruction, apply the reduction operator to two of the data elements in each lane, reduce the two data elements into one data element, and shift one or more remaining data elements when there is at least one of the data elements remaining in each lane;
  - wherein the execution circuitry is to convert reduction code without the vector reduction instruction into translated reduction code with the vector reduction instruction, wherein the reduction code and the translated reduction code specify a same sequence of reduction operations applied to the array of data elements across the plurality of lanes and generate a same result.

14. The system of claim 13, wherein the execution circuitry responsive to the vector reduction instruction is to insert a zero to a highest-order position in each lane.

15. The system of claim 13, wherein the reduction operator includes add, subtract or multiply.

16. The system of claim 13, wherein the execution circuitry is to apply the reduction operator to two of lowest-ordered data elements in each lane.

17. The system of claim 13, wherein the execution circuitry responsive to the vector reduction instruction is to shift each of the remaining data elements one position to the right within each lane.

* * * * *